(12) United States Patent
Pham et al.

(10) Patent No.: US 8,091,603 B2
(45) Date of Patent: Jan. 10, 2012

(54) ONE-PIECE INNER SHELL FOR FULL BARREL COMPOSITE FUSELAGE

(75) Inventors: Doan D. Pham, Tacoma, WA (US); Mark W. Tollan, Puyallup, WA (US)

(73) Assignee: The Boeing Company, Chicago, IL (US)

(*) Notice: Subject to any disclaimer, the term of this patent is extended or adjusted under 35 U.S.C. 154(b) by 688 days.

(21) Appl. No.: 12/258,138

(22) Filed: Oct. 24, 2008

(65) Prior Publication Data

US 2009/0044914 A1    Feb. 19, 2009

Related U.S. Application Data

(62) Division of application No. 11/343,701, filed on Jan. 31, 2006, now Pat. No. 7,459,048.

(51) Int. Cl.
*B32B 37/00* (2006.01)
*B65H 81/00* (2006.01)

(52) U.S. Cl. ........................... 156/425; 156/500

(58) Field of Classification Search .............. 156/500, 156/425, 173, 175
See application file for complete search history.

(56) References Cited

U.S. PATENT DOCUMENTS

| 3,999,912 | A | | 12/1976 | Hall |
| 5,192,384 | A | * | 3/1993 | Barrier et al. ............... 156/189 |
| 5,223,067 | A | * | 6/1993 | Hamamoto et al. ......... 156/173 |
| 5,814,386 | A | * | 9/1998 | Vasiliev et al. ............. 428/36.3 |
| 6,050,315 | A | * | 4/2000 | Deckers et al. ............. 156/433 |
| 6,245,274 | B1 | * | 6/2001 | Huybrechts et al. ......... 264/257 |
| 6,613,258 | B1 | | 9/2003 | Maison et al. |
| 2004/0216805 | A1 | * | 11/2004 | Teufel ............................ 141/11 |

FOREIGN PATENT DOCUMENTS

JP    61169394 A    7/1968

OTHER PUBLICATIONS

Kuang-Hua Chang, "All-Digital Design and Manufacturing (ADDM) A New Development in Engineering Education," Exploring Innovation in Education and Research, Mar. 1-5, 2005, pp. 1-8, Tainan, Taiwan.

\* cited by examiner

*Primary Examiner* — Jeff Aftergut

(74) *Attorney, Agent, or Firm* — Ostrager Chong Flaherty & Broitman P.C.

(57) ABSTRACT

A mandrel for manufacturing a unitary seamless section of an aircraft fuselage comprises a thin lay-up mandrel element disposed onto the outer shell surface of an inner mandrel shell, forming a mandrel with a substantially continuous lay-up surface. A unitary pre-cured section of an aircraft fuselage is formed by laying up a plurality of resin impregnated skin fibers onto the mandrel's lay-up surface while the mandrel rotates.

22 Claims, 5 Drawing Sheets

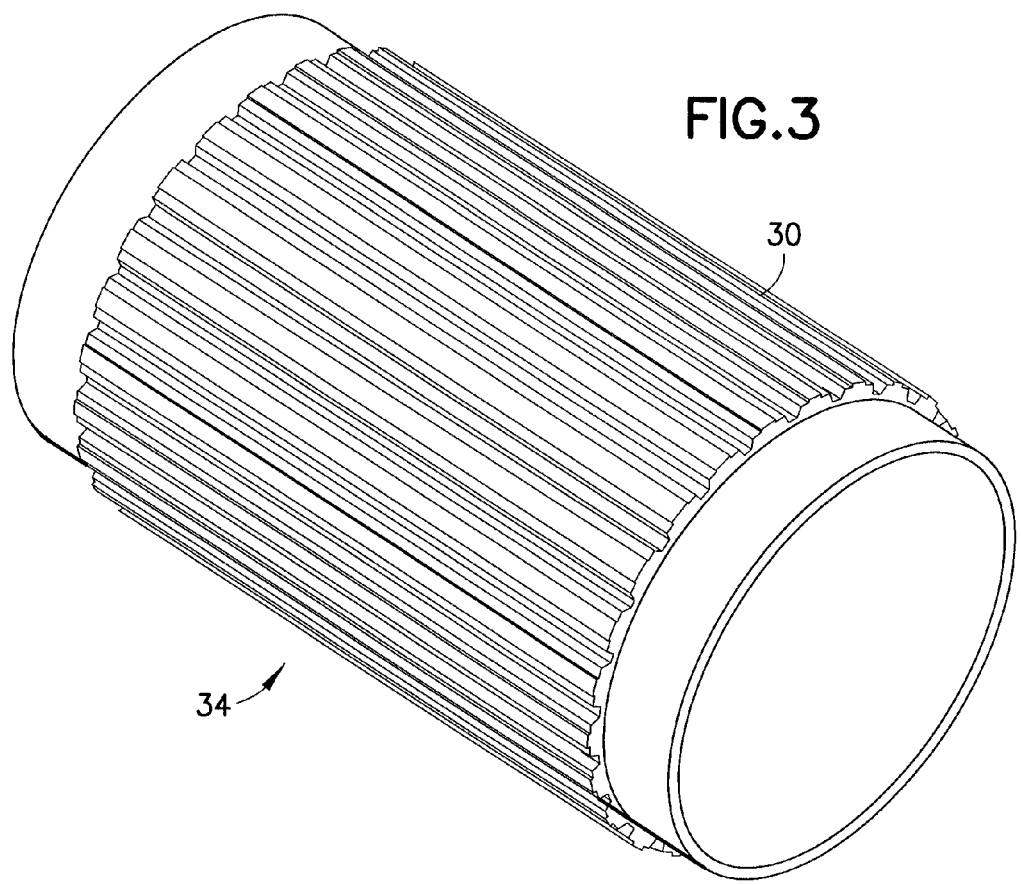
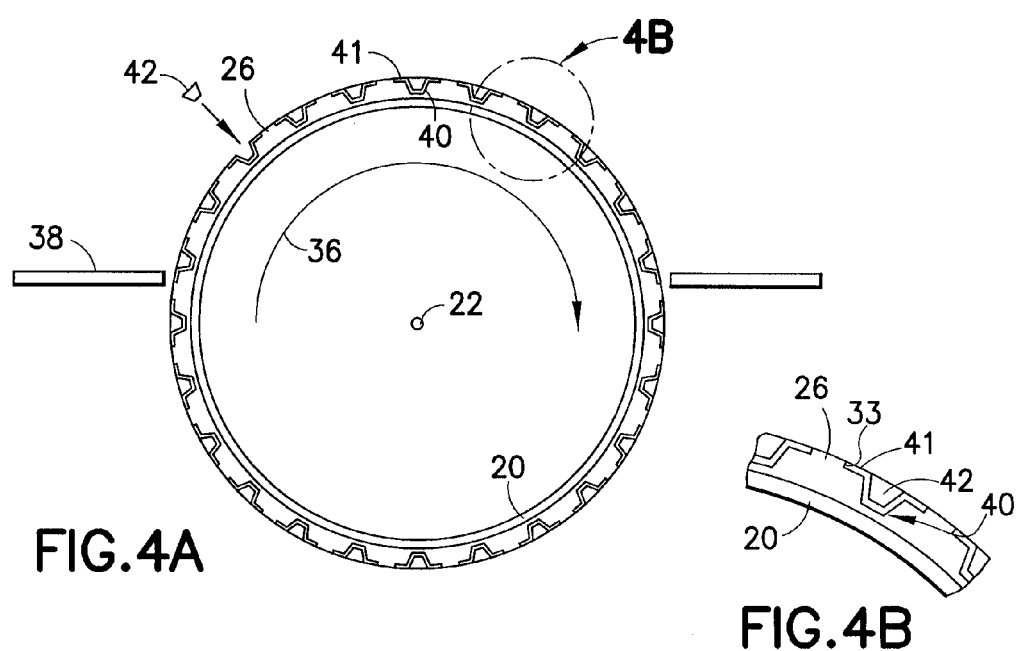

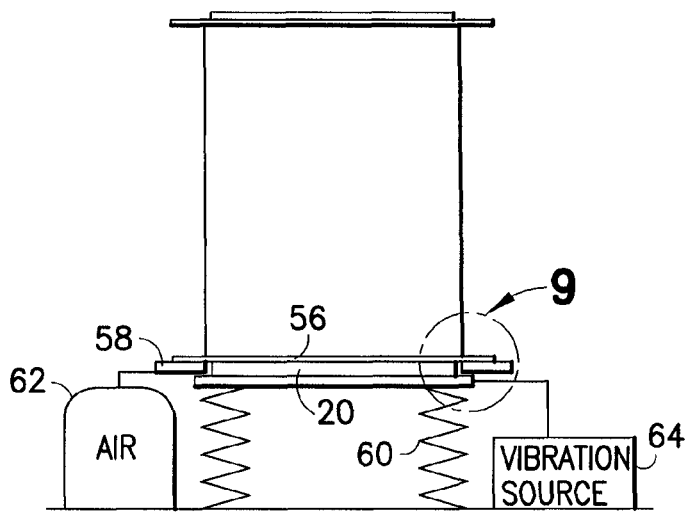
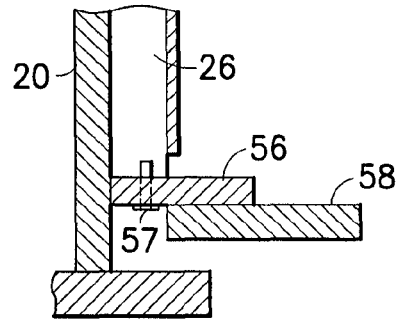
FIG.8
FIG.9
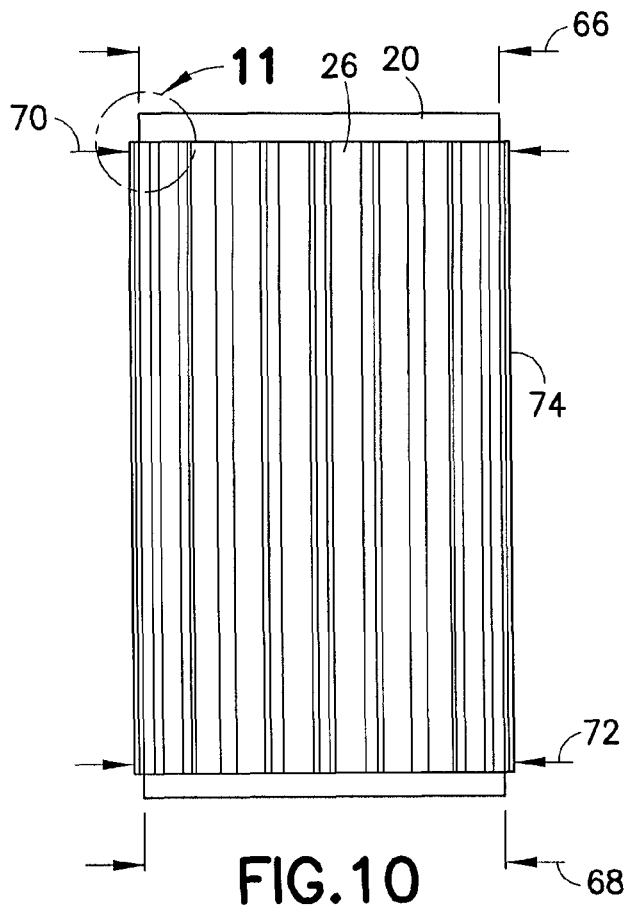
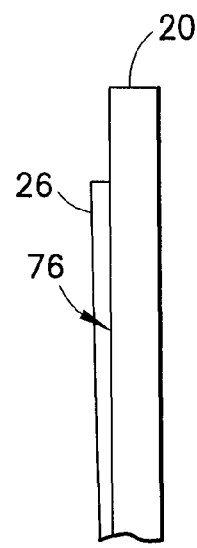
FIG.10
FIG.11

ONE-PIECE INNER SHELL FOR FULL BARREL COMPOSITE FUSELAGE

RELATED APPLICATION

This application is a divisional application of, and claims priority from, prior application Ser. No. 11/343,701, filed Jan. 31, 2006, now U.S. Pat. No. 7,459,048, and is incorporated by reference herein.

TECHNICAL FIELD

This application relates generally to a one-piece inner shell for full-barrel composite fuselage manufacture, and, more particularly to a mandrel assembly providing for the manufacture of a unitary seamless section of an aircraft fuselage.

BACKGROUND

Composite structures are highly prized for their ability to combine high strength and design flexibility with resultant reduced weight structures. As such, in many fields they dominate the manufacturing landscape. Despite their popularity, or perhaps as a result of it, composite lay-up structures have generated a host of new manufacturing challenges. These challenges often stem from attempts to apply the composite design methodologies to complex structures. Large-scale structures such as aircraft fuselage structures provide considerable challenges to composite lay-up manufacturing.

Present composite lay-up fuselage methodologies approach fuselage manufacturing through the use of multi-piece sections requiring longitudinal splices between individual sections. This generates an increase in weight and cost of the resultant product. In addition, the tooling is often comprised of multi-sectional tooling that requires seals between tooling sections. These seals may be prone to leakage and may fail to provide the vacuum integrity needed for an autoclave curing procedure. This further complicates and diminishes fuselage lay-up manufacturing. An apparatus and method for laying up a single-piece fuselage section that eliminated the need for seals and had improved vacuum integrity during autoclave procedures would allow for a reduction in weight and cost of both tooling as well as the finalized fuselage section.

It would, therefore, be highly desirable to provide a one-piece fuselage mandrel capable of laying up a fuselage section without the need for seals. Similarly, it would be highly desirable to have a methodology for manufacturing a unitary seamless section of an aircraft fuselage.

SUMMARY

A mandrel is disclosed for use in manufacturing a unitary seamless section of an aircraft fuselage comprising a one-piece inner mandrel shell having an outer shell surface and a thin lay-up mandrel element disposable onto the outer shell surface to form a mandrel with a substantially continuous lay-up surface. When a plurality of resin impregnated skin fibers is layed-up onto the lay-up surface, a unitary pre-cured section of an aircraft fuselage is formed.

In a preferred embodiment, the thin lay-up mandrel comprises a plurality of caul plates disposable onto said outer shell surface to form a mandrel with a lay-up surface. The caul plates may be arranged longitudinally parallel to the longitudinal axis of said one-piece inner mandrel shell and comprise a plurality of longitudinal stiffener channels formed into a caul outer surface. A plurality of resin impregnated stiffener fibers are disposable within said plurality of stiffener channels such that top ends of said stiffener fibers form a flush mandrel surface. When a plurality of resin impregnated skin fibers are laid up onto said lay-up surface, a unitary pre-cured section of an aircraft fuselage is formed. In a further embodiment, the caul plates may be abutted end to end around the outer shell surface to form the lay-up surface.

Thus, a one-piece fuselage mandrel capable of laying up a fuselage section without the need for seals is provided. Other features will become apparent when viewed in light of the detailed description of the preferred embodiment when taken in conjunction with the attached drawings and appended claims.

BRIEF DESCRIPTION OF THE DRAWINGS

FIG. 3 is an illustration of a mandrel for use in manufacturing the unitary seamless section of aircraft fuselage illustrated in FIG. 1, the mandrel illustrated with the entire thin lay-up mandrel element installed;

FIG. 4A is an illustration of the mandrel assembly from FIG. 3 in operation wherein a plurality of stiffeners are being laid-up;

FIG. 4B is a detailed illustration of a portion of the mandrel assembly illustrated in FIG. 4A;

FIG. 8 is an illustration of a plurality of methods of removing the inner mandrel shell from out of the thin lay-up mandrel element illustrated in FIG. 7;

FIG. 9 is a detailed illustration of a portion of the thin mandrel shell and thin lay-up mandrel illustrated in FIG. 8;

FIG. 10 is an illustration of an alternate feature of the mandrel assembly illustrated in the preceding figures, the embodiment illustrating a complemented tapered inner mandrel shell and tapered thin lay-up mandrel element; and FIG. 11 is a detailed illustration of the tapers described and illustrated in FIG. 10.

DESCRIPTION OF THE PREFERRED EMBODIMENT(S)

Figure 1:
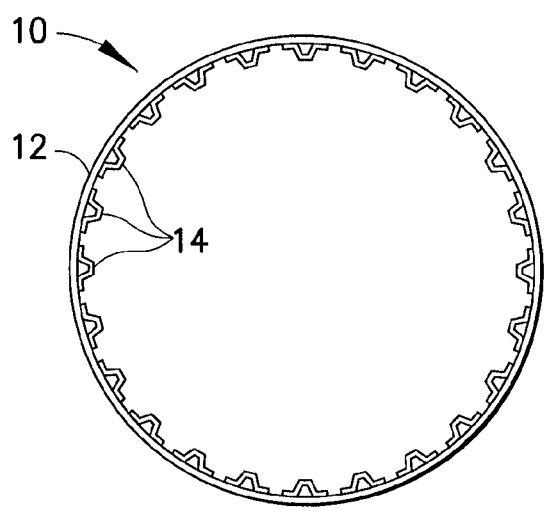
FIG. 1 is an illustration of a unitary seamless section of aircraft fuselage in accordance with a number of embodiments.

FIG. 1 is an illustration of a unitary seamless composite section of aircraft fuselage 10 in accordance with a number of embodiments. It is contemplated that a "section" of an aircraft fuselage is defined as a generally tubular section or barrel of the fuselage, particularly one that is made from a composite. A plurality of such sections 10 may be attachable end to end to form a longer barrel or section of the fuselage. It is intended that the term "unitary" is defined as a one-piece continuous, contiguous, seamless section of fuselage. The unitary seamless section of aircraft fuselage 10 is comprised of a fuselage skin 12 and a plurality of fuselage stiffeners 14 formed on the inner surface of the fuselage skin 12.

Figure 2:
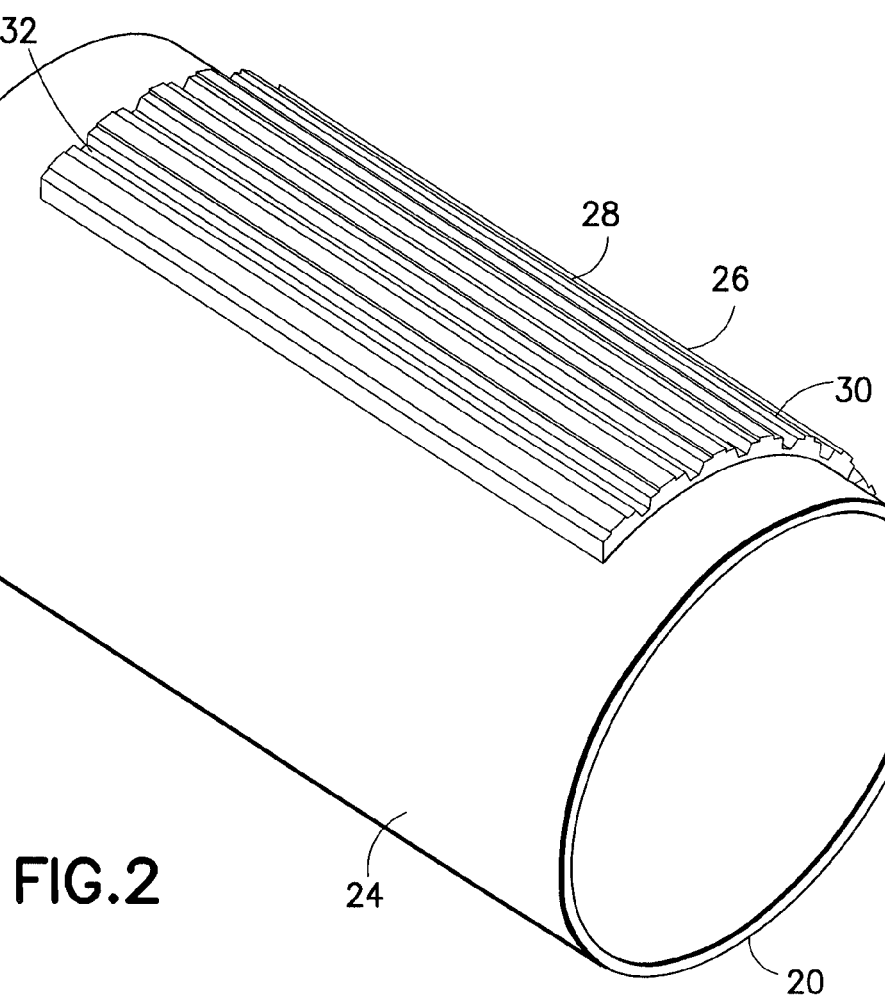
FIG. 2 is an illustration of a mandrel for use in manufacturing the unitary seamless section of aircraft fuselage illustrated in FIG. 1, the mandrel illustrated with only a partial amount of the thin lay-up mandrel element installed.

The section of fuselage 10 is formed in a novel and unique methodology. In a number of embodiments, the method utilizes a one-piece cylindrical inner mandrel shell 20 (FIG. 2) rotatable about a mandrel axis 22 (FIG. 4A), which provides a hard, continuous surface that prevents leaks during the curing process. The one-piece generally cylindrical inner mandrel shell 20 includes an outer shell surface 24 to which a thin lay-up mandrel element 26 can be mounted. Although a variety of thin lay-up mandrel elements 26 are contemplated, one embodiment contemplates the use of a plurality of caul plates 28 abutted end-to-end around the outer shell surface 24 to form a contiguous lay-up surface 30. The caul plates 28 may be any hard material, for example, metal or graphite materials, and may be temporarily clamped or screwed to the inner mandrel shell 20 to maintain their position. The thin lay-up mandrel element 26 preferably includes a plurality of stiffener channels 32 formed therein. The thin lay-up mandrel element 26 (e.g., the plurality of caul plates 28) and solid one-piece cylindrical inner mandrel shell 20 act together to form a mandrel 34 (FIG. 3).

Figure 5:
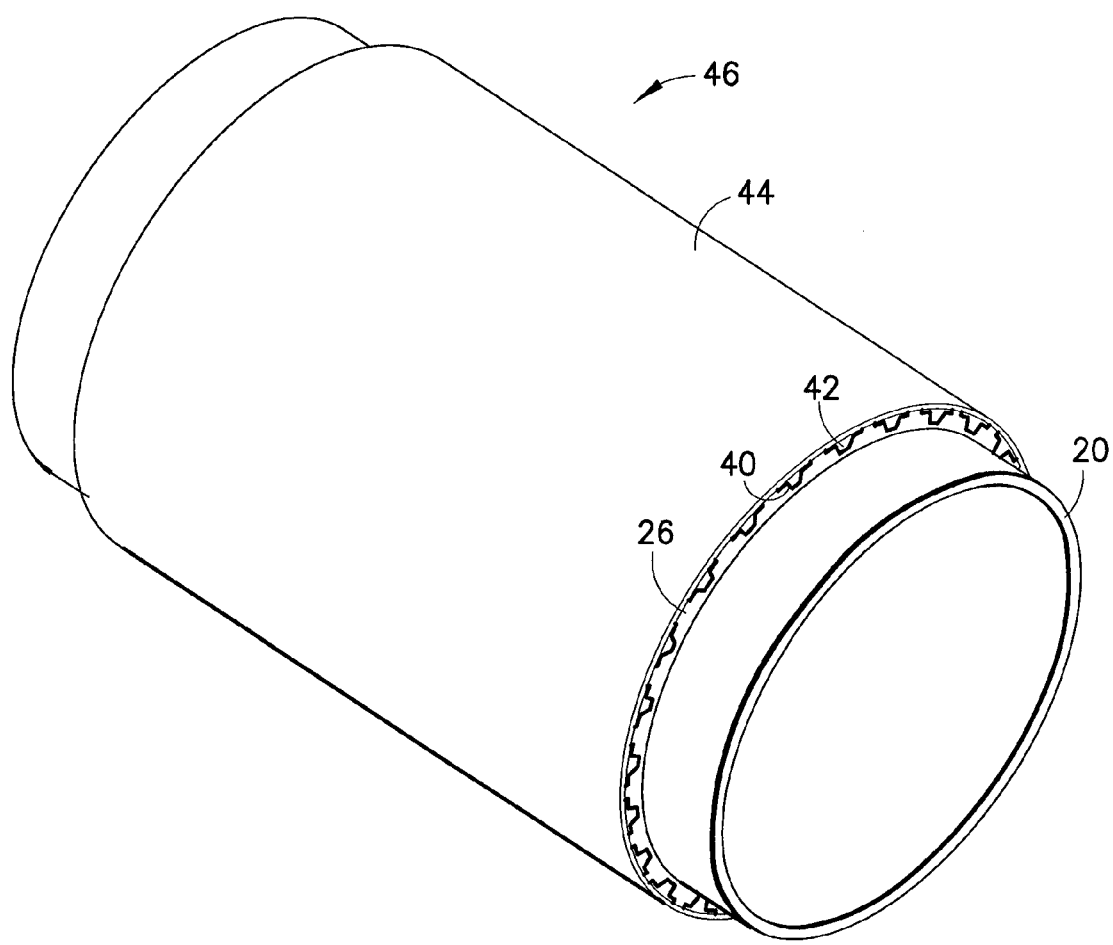
FIG. 5 is an illustration of the mandrel assembly from FIG. 4 in operation wherein a plurality of resin impregnated skin fibers are being laid-up.

By orientating the mandrel 34 horizontally and rotating it in one direction 36 about the mandrel axis 22, lay-up may be accomplished by way of a work platform 38 positioned adjacent the mandrel 34 as shown in the embodiment of FIG. 4A. A plurality of resin impregnated stiffener fibers 40 (or "stringers") are laid up within each of the plurality of stiffener channels 32 as the mandrel rotates. The stiffener channels 32 are provided with a longitudinal groove 33 (FIG. 4B) that accepts the top ends 41 of the stiffener fibers 40 to form a flush mandrel surface. A plurality of rubber mandrels 42 may be inserted into each of the stiffener channels 32 after lay-up of the stiffener fibers 40 in order to insure proper stiffener shape prior to curing. After curing, the rubber mandrels 42 are removed. Following the lay-up of stiffener fibers 40, the disclosure contemplates the lay-up of a plurality of resin impregnated skin fibers 44 on top of the plurality of resin impregnated stiffener fibers 40. The number of skin fibers 44 used depends on the end-use application. For example, any number of layers from 3 to about 40 may be used. In general, stronger fuselages able to withstand high pressure require more layers. The resultant structure as shown in FIG. 5 is a pre-cured section of an aircraft fuselage 46 still attached to the mandrel.

Figure 6:
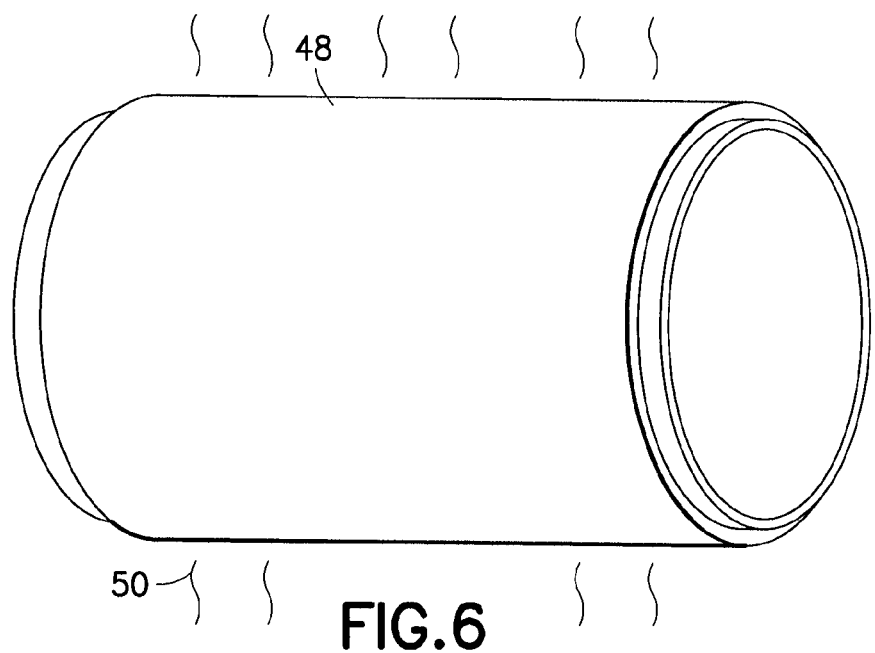
FIG. 6 is an illustration of the mandrel assembly from FIG. 5 in operation wherein the mandrel and lay-ups are vacuum bagged and cured.

The pre-cured section of an aircraft fuselage 46 may be manufactured in some of the embodiments without utilizing tooling that requires seals. The solid one-piece cylindrical inner mandrel shell 20 also permits the mandrel 34 to be subjected to vacuum forces without any concern of seal leakage. Accordingly, in a number of embodiments, the pre-cured section 46 may be vacuum bagged 48 while still on the mandrel, with the assembly then being subject to curing 50 (FIG. 6). After curing, the vacuum bagging 48 is removed. The end result of curing is that the unitary seamless section of aircraft fuselage 10 is generated. The unitary section 10 may then be removed from the mandrel 34 to be utilized in the manufacture of an aircraft.

Figure 7:
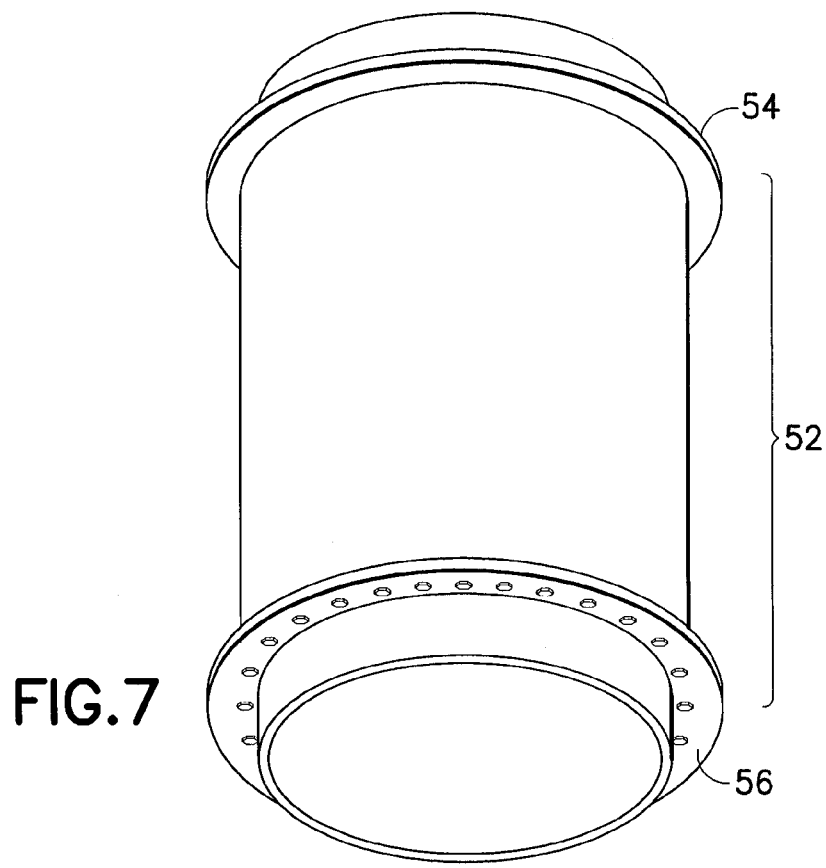
FIG. 7 is an illustration of an alternate embodiment of the mandrel assembly illustrated in the preceding figures, the embodiment including a first and second support ring mounted to the thin lay-up mandrel element.

A plurality of embodiments to remove the mandrel 34 from the solid unitary section of cured fuselage 10 will be described. In one embodiment, at least one support ring 52 (for example, including a first support ring 54 and a second support ring 56) may be utilized (FIG. 7). The support ring 52 (54, 56) may be mounted to the side ends of the thin lay-up mandrel element 26 by a bolt or screw 57 (FIG. 9) or any other attachment means. The support rings 52 may be mounted on the mandrel element either before or after the lay-up and curing steps. The support rings 52 allow for a separating force to be applied to the thin mandrel element 26, such that the inner mandrel shell 20 can be removed. Once the mandrel shell 20 is removed, the thin mandrel elements 26 are easily separated from the cured product.

Referring to FIG. 8, the mandrel may be positioned vertically and one of the support rings 56 may be engaged to a lateral support structure 58. The cylindrical inner mandrel shell 20 can then be supported by a spring or other flexible support 60. In such an arrangement, gravity may be utilized to allow the relatively unsupported and heavy inner mandrel shell 20 to separate from the thin lay-up mandrel 26. In a further embodiment shown in FIGS. 8 and 9, an air supply 62 may be utilized to force air in between the thin lay-up mandrel 26 and inner mandrel shell 20 in order facilitate their separation. In still another embodiment also shown in FIGS. 8 and 9, a vibrational source 64 may alternately load the thin lay-up mandrel element 26 or inner mandrel shell 20 in order to facilitate their separation.

As illustrated in FIGS. 10 and 11, separation may also be facilitated by the use of a tapered thin lay-up mandrel element 26 and an oppositely tapered one-piece cylindrical inner mandrel shell 20. The opposite tapers facilitate removal of inner mandrel shell 20. Tapers of about 0.5 degree are sufficient, but larger tapers may be used. In some of these embodiments, the inner mandrel shell 20 may include a smaller shell outer diameter 66 and a larger shell outer diameter 68. The thin lay-up mandrel 26 has a tapered inner surface, such that the thickness of the thin lay-up mandrel 26 varies from one end to the other. The thin lay-up mandrel 26 may include a larger plate inner dimension 70 and a smaller plate inner dimension 72. The larger plate inner dimension 70 complements the smaller shell outer diameter 66 and the smaller plate inner dimension 72 complements the larger shell outer dimension 68 such that a substantially uniform dimension lay-up surface 74 is generated. A detail of the counter tapers 76 is illustrated in FIG. 11 (shown slightly exaggerated). The counter tapers 76 allow the one-piece cylindrical inner mandrel shell 20 to be removed from the center of the thin lay-up mandrel element(s) 26 after curing by any of the removal methods described above. In this fashion, the manufacturing of a seamless section of an aircraft fuselage 10 is significantly improved.

Many modifications and variations may of course be devised given the above description of the principles in this disclosure. It is intended that all such modifications and variations be considered as within the spirit and scope of this disclosure, as defined in the following claims.

What is claimed is:

1. A mandrel for use in manufacturing a unitary seamless section of an aircraft fuselage comprising:

a cylindrical inner mandrel shell having an outer shell surface, said outer shell surface having an outer taper from a first shell end to a second shell end such that an outer diameter of the inner mandrel shell is larger at the first shell end than at the second shell end;

a thin lay-up mandrel element disposable onto said outer shell surface to form a mandrel with a substantially continuous lay-up surface, said thin lay-up mandrel element having an inner element surface having an inner taper from a first element end to a second element end such that an inner diameter of said thin lay-up mandrel element is smaller at the first element end than at the second element end, the inner taper being arranged to be opposite the outer taper.

2. A mandrel according to claim 1, wherein said inner mandrel shell comprises a one-piece shell and said thin lay-up mandrel element comprises a plurality of caul plates.

3. A mandrel according to claim 1, wherein the inner taper complements the outer taper, such that said lay-up surface has a substantially uniform dimension from the first element end to the second element end.

4. A mandrel according to claim 1, further comprising:
a plurality of stiffener channels formed in said thin lay-up mandrel element, said plurality of stiffener channels adapted to receive a plurality of resin impregnated stiffener fibers: and
a plurality of rubber mandrels configured to fit into each of said plurality of stiffener channels after laying up said plurality of resin impregnated stiffener fibers.

5. A mandrel according to claim 1, further comprising:
at least one support ring engaged to said thin lay-up mandrel element, said at least one support ring supporting said thin lay-up mandrel element while said cylindrical inner mandrel shell is removed.

6. A mandrel according to claim 1, wherein the inner taper and the outer taper are at least about 5 degrees.

7. A mandrel according to claim 1, further comprising:
an air source in communication with said cylindrical inner mandrel shell such that said air source forces air in between said thin lay-up mandrel element and said cylindrical inner mandrel shell to facilitate removal of said cylindrical inner mandrel shell.

8. A mandrel according to claim 1, further comprising:
a vibrational source in communication with said cylindrical mandrel inner shell such said vibrational source applies a vibrational load to said thin lay-up mandrel element to facilitate removal of said cylindrical inner mandrel shell.

9. A mandrel for use in manufacturing a unitary seamless section of an aircraft fuselage comprising:
a one-piece inner mandrel shell having an outer shell surface, the outer shell surface having an outer taper from a first shell end to a second shell end such that an outer diameter of the inner mandrel shell is larger at the first shell end than at the second shell end;
a plurality of caul plates disposable onto said outer shell surface to form a mandrel with a lay-up surface, said caul plates arranged longitudinally parallel to the longitudinal axis of said one-piece inner mandrel shell, said plurality of caul plates having an inner caul surface having an inner taper from a first caul end to a second caul end such that an inner diameter of said plurality of caul plates is smaller at the first caul end than at the second caul end, the inner taper being arranged to be opposite the outer taper.

10. A mandrel according to claim 9, wherein the inner taper complements the outer taper, such that said lay-up surface has a substantially uniform dimension from the first caul end to the second caul end.

11. A mandrel according to claim 9, further comprising:
at least one support ring engaged to said caul plates, said at least one support ring supporting said caul plates while said inner mandrel shell is removed.

12. A mandrel according to claim 9, wherein the inner taper and the outer taper are at least about 5 degrees.

13. A mandrel according to claim 9, further comprising:
an air source in communication with said inner mandrel shell such that said air source forces air in between said caul plates and said inner mandrel shell to facilitate removal of said inner mandrel shell.

14. A mandrel according to claim 9, further comprising:
a vibrational source in communication with said inner mandrel shell such that said vibrational source applies a vibrational load to said caul plates to facilitate removal of said inner mandrel shell.

15. A mandrel for use in laying up a unitary pre-cured seamless section of an aircraft fuselage comprising:
a cylindrical one-piece inner mandrel shell having an outer shell surface, the outer shell surface having an outer taper from a first shell end to a second shell end such that an outer diameter of the inner mandrel shell is larger at the first shell end than at the second shell end;
a plurality of caul plates disposable onto said outer shell surface, said caul plates abutted end-to-end around said outer shell surface to form a contiguous lay-up surface having a plurality of longitudinal stiffener channels formed therein, said plurality of caul plates having an inner caul surface having an inner taper from a first caul end to a second caul end such that an inner diameter of said plurality of caul plates is smaller at the first caul end than at the second caul end, the inner taper being arranged to be complementary to and opposite the outer taper; the inner taper complementing the outer taper such that lay-up surface has a substantially uniform dimension from the first caul end to the second caul end.

16. A mandrel according to claim 15, wherein the plurality of caul plates are arranged longitudinally parallel to the longitudinal axis of said one-piece inner mandrel shell.

17. A mandrel according to claim 15, wherein said plurality of stiffener channels are adapted to receive a plurality of resin impregnated stiffener fibers, such that top ends of said stiffener fibers are flush with said lay-up surface.

18. A mandrel according to claim 17, further comprising a plurality of rubber mandrels configured to fit into each of said plurality of stiffener channels after laying up said plurality of resin impregnated stiffener fibers.

19. A mandrel according to claim 15, further comprising:
at least one support ring engaged to said caul plates, said at least one support ring supporting said caul plates while said inner mandrel shell is removed.

20. A mandrel according to claim 15, wherein the inner taper and the outer taper are at least about 5 degrees.

21. A mandrel according to claim 15, further comprising:
an air source in communication with said inner mandrel shell such that said air source forces air in between said caul plates and said inner mandrel shell to facilitate removal of said inner mandrel shell.

22. A mandrel according to in claim 15, further comprising:
a vibrational source in communication with said inner mandrel shell such that said vibrational source applies a vibrational load to said caul plates to facilitate removal of said inner mandrel shell.

* * * * *